United States Patent
Taylor et al.

(10) Patent No.: US 7,490,761 B2
(45) Date of Patent: Feb. 17, 2009

(54) CONDUCTING ASSISTED SELF-SERVICE TRANSACTIONS WHERE APPROVAL IS NEEDED

(75) Inventors: Norman G. Taylor, Dundee (GB); John G. Savage, Fife (GB)

(73) Assignee: NCR Corporation, Dayton, OH (US)

(*) Notice: Subject to any disclaimer, the term of this patent is extended or adjusted under 35 U.S.C. 154(b) by 12 days.

(21) Appl. No.: 12/001,816

(22) Filed: Dec. 13, 2007

(65) Prior Publication Data

US 2008/0093441 A1    Apr. 24, 2008

Related U.S. Application Data (63) Continuation-in-part of application No. 11/316,037, filed on Dec. 22, 2005, now Pat. No. 7,464,860.

(51) Int. Cl.
*G06F 19/00* (2006.01)
*G06K 5/00* (2006.01)
(52) U.S. Cl. .................. 235/379; 235/382
(58) Field of Classification Search ............ 235/379, 235/382, 383
See application file for complete search history.

(56) References Cited

U.S. PATENT DOCUMENTS

| | | | |
|---|---|---|---|
| 3,876,864 A | 4/1975 | Clark et al. | |
| 5,563,393 A | 10/1996 | Coutts | |
| 6,003,019 A | 12/1999 | Eaton et al. | |
| 6,012,050 A | 1/2000 | Eaton et al. | |
| 6,013,107 A * | 1/2000 | Blackshear et al. | 709/229 |
| 6,305,603 B1 | 10/2001 | Grunbok et al. | |
| 6,702,181 B2 | 3/2004 | Ramachandran | |
| 6,793,134 B2 | 9/2004 | Clark | |
| 7,040,533 B1 | 5/2006 | Ramachandran | |
| 2002/0138432 A1 | 9/2002 | Makino et al. | |

* cited by examiner

*Primary Examiner*—Thien M. Le
*Assistant Examiner*—April A Taylor
(74) *Attorney, Agent, or Firm*—Gregory A. Welte (57) ABSTRACT

A system for use in assisting a self-service transaction at a service facility includes an assisted self-service terminal configured for use by a customer in conducting a business transaction with the service facility and a notification mechanism configured to transmit a message indicating that a human representative of the service facility must take action before the business transaction can continue. The system also includes an interface component that allows the human representative to take action in connection with the transaction.

15 Claims, 9 Drawing Sheets

CONDUCTING ASSISTED SELF-SERVICE TRANSACTIONS WHERE APPROVAL IS NEEDED

CROSS-REFERENCE TO RELATED APPLICATION

This application is a continuation-in-part of U.S. application Ser. No. 11/316,037, titled "Conducting Assisted Self-Service Transactions in a Banking Facility Through a Database Schema" and filed on Dec. 22, 2005 now U.S. Pat. No. 7,464,860, by Joe Militello, Mario Perottino, Gerard Savage and Norman Taylor.

BACKGROUND

Assisted self-service is becoming increasingly common in many types of consumer transactions, most notably in areas such as retail-store check-out, airport check-in, and fast-food purchasing. These transactions are "self service" in nature in that the consumer is enabled by the underlying self-service technology to perform a transaction with little, if any, assistance from a human representative of the service provider. These transactions are "assisted" in nature in that a human representative of the service provider typically monitors the self-service transaction from a nearby vantage point and is available to help the consumer complete the transaction if need be.

For years the banking industry has been a leader in self-service through the automated teller machine, or ATM. Despite the ubiquity and general familiarity of the ATM throughout much of the world, however, the demand for human involvement in consumer transactions in the banking industry remains high. This is true for at least two reasons: (1) Many banking transactions do not lend themselves to completion on a fully automated self-service machine; and (2) many banking customers simply are not comfortable conducting transactions through an ATM, particularly those who have made a journey to a branch banking facility. The result is that the banking customers continue to rely heavily on direct interaction with the human representatives (the "branch tellers") of the banking institutions, even for transactions that could be conducted without such interaction.

Very recently, banking institutions have begun to explore the possibilities for conducting assisted self-service in their physical branches. Under this model, consumers are able to conduct transactions, at least in part, on a self-service terminal, with assistance from a branch teller if needed. To date, however, attempts at assisted self-service in the banking industry have been rudimentary at best, and the financial institutions are finding it very difficult to conduct these transactions efficiently and effectively in the real-world environment, particularly since the technology platforms on which banking transactions occur are often highly fragmented—constructed from components that come from multiple vendors or that represent multiple generations of a vendor's technology.

One assisted self-service technique that has been attempted at some bank branches involves the use of assisted self-service terminals through which bank customers carry their transactions as far as possible without teller assistance, then received a printed receipt that provides transaction details, along with instructions to present the receipt to a bank teller. The teller then keys the transaction details from the receipt into a teller terminal and ultimately completes the customer's transaction there.

SUMMARY

Described below is a system for use in assisting a self-service transaction at a service facility. The system includes an assisted self-service terminal configured for use by a customer in conducting a business transaction with the service facility and a notification mechanism configured to transmit a message indicating that a human representative of the service facility must take action before the business transaction can continue. The system also includes an interface component that allows the human representative to take action in connection with the transaction.

In some systems, the notification mechanism includes a teller terminal through which the human representative monitors operation of the assisted self-service terminal, quite often by receiving information from a database system or a file-management system that receives the information from the assisted self-service terminal. In other systems, the notification mechanism is driven by the assisted self-service terminal, and in certain systems it is a mechanism as simple as a light positioned in a manner to be visible to the human representative when the human representative is standing away from the assisted self-service terminal.

In some systems the interface mechanism resides at the self-service terminal. The interface component often presents the human representative with an option to authorize the business transaction, reject the business transaction, or transfer details about the business transaction to a teller terminal.

Other features and advantages will become apparent from the description and claims that follow.

DETAILED DESCRIPTION

Figure 1:
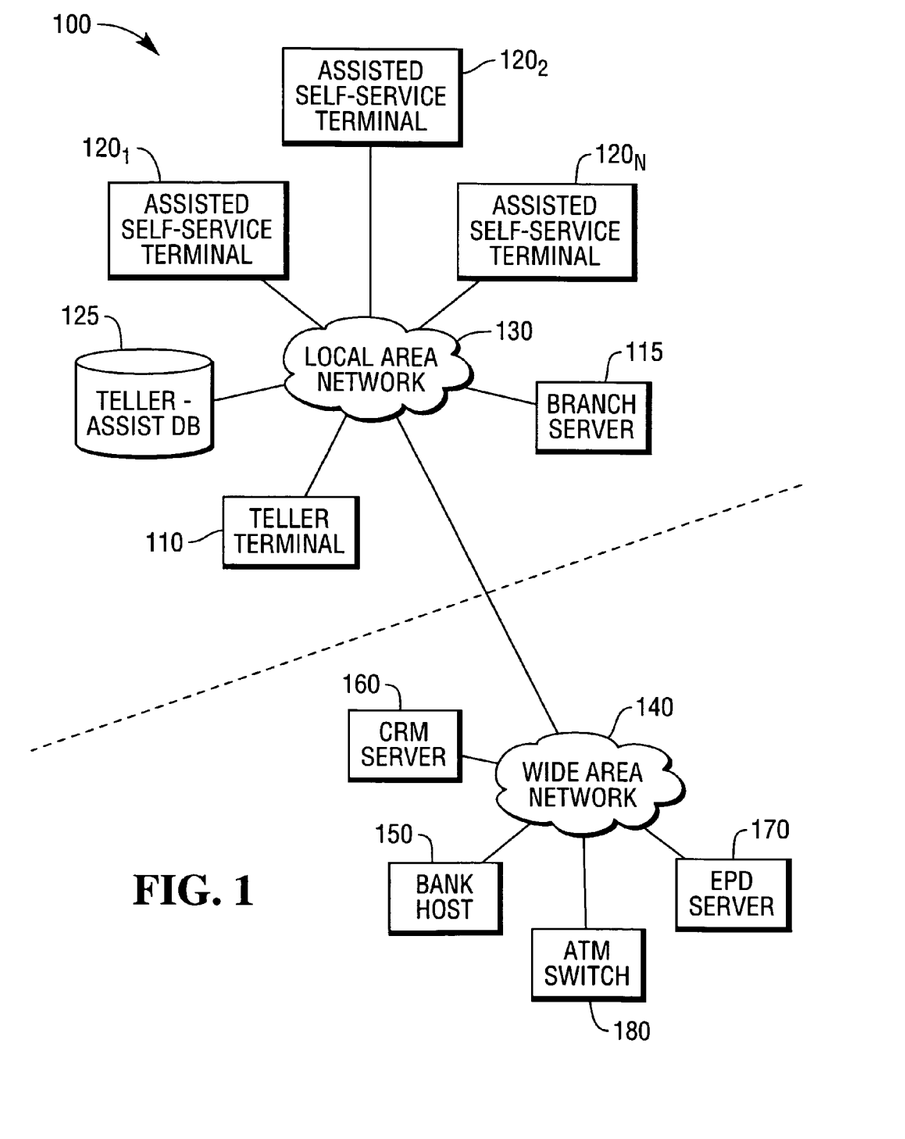
FIG. 1 shows a banking facility that supports assisted self-service transactions.

FIG. 1 shows an example of the infrastructure 100 of a banking facility ("branch") for a banking institution that supports assisted self-service transactions for its customers. The infrastructure includes at least one teller terminal 110 (and often more) that interacts with multiple assisted self-service terminals $120_{1...N}$. The assisted self-service terminals $120_{1...N}$ are used by bank customers to engage in banking transactions that either cannot be completed on traditional ATMs or for which the customers are uncomfortable using an ATM. The teller terminal 110 is used by a human representative ("teller") of the banking institution to monitor and, when needed, to assist customers engaged in transactions at the assisted self-service terminals $120_{1...N}$. In many cases, the teller terminal 110 is also used to complete or fulfill the customer's transactions. In other cases, the teller terminal (or some other mechanism) is used to notify the teller that teller action is required at the assisted self-service terminal before the customer's transaction can be completed or fulfilled.

The teller terminal 110 and assisted self-service terminals $120_1 \ldots _N$ each connect to a local area network ("branch LAN") 130 that resides in the banking facility. The LAN 130 in turn connects to a wide area network ("WAN") 140 that links the banking facility to banking services located outside the banking facility. For many banking institutions, the WAN 140 is a computer network that connects at least some portion, if not all, of the institution's branch locations to a central repository of information and banking services. This repository typically resides on one or more bank host servers 150, which are computer systems located across the institution's network. The WAN 140 also often connects the banking facility to services such as a customer-relationship management ("CRM") server 160, which stores information about customers of the banking institution and supports applications that allow the banking facility to access this customer information and use it to improve and expand the business relationship that the bank has with these customers. The WAN 140 also often connects the banking facility to an electronic-payment-and-deposit ("EPD") processing server 170, which facilitates the electronic execution of payment and deposit transactions involving written financial instruments, such as checks, using image capture and other electronic techniques to substitute for the physical processing of the instrument. The WAN 140 also typically connects the banking facility and its self-service terminals to an ATM switch 180, which in turns connects to the worldwide ATM network that allows customers to perform self-service financial transactions at ATMs all over the world. Bank host servers, CRM servers, EPD processing servers, and ATM switches and networks are all well understood in the banking industry and are not described in any more detail here.

Within the banking facility, the LAN 130 also connects the teller terminal 110 and assisted self-service terminals $120_1 \ldots _N$ to the bank's branch server 115, a computer system that stores an array of information and provides applications that support the banking transactions that take place in the banking facility. Branch servers like this one are well understood in the banking industry and are not described in any more detail here.

The LAN 130 also connects the teller terminal 110 and the assisted self-service terminals $120_1 \ldots _N$ to a teller-assist database (DB) system 125. The teller-assist DB system 125 provides a database schema to serve as a communication mechanism and repository of information for transactions occurring between the teller terminal 110 and the assisted self-service terminals $120_1 \ldots _N$. The teller-assist DB system 125 eliminates the need to support many and varying complex messaging interfaces that would otherwise be required in the typical banking facility to support communication between the teller terminal 110 and the assisted self-service terminals $120_1 \ldots _N$. In particular, the teller-assist DB system 125 allows, among other things: (1) The teller and assisted self-service terminals to share critical information, such as consumer, account and transaction information, that is obtained through the banking institution's WAN 140 and the existing ATM switch infrastructure; (2) the teller terminal to manage the assisted self-service terminals; and (3) the assisted self-service terminals to report to the teller terminal all consumer and transaction information gathered while executing transactions. The teller-assist DB system 125 and its structure and function are described in more detail below.

Figure 2:
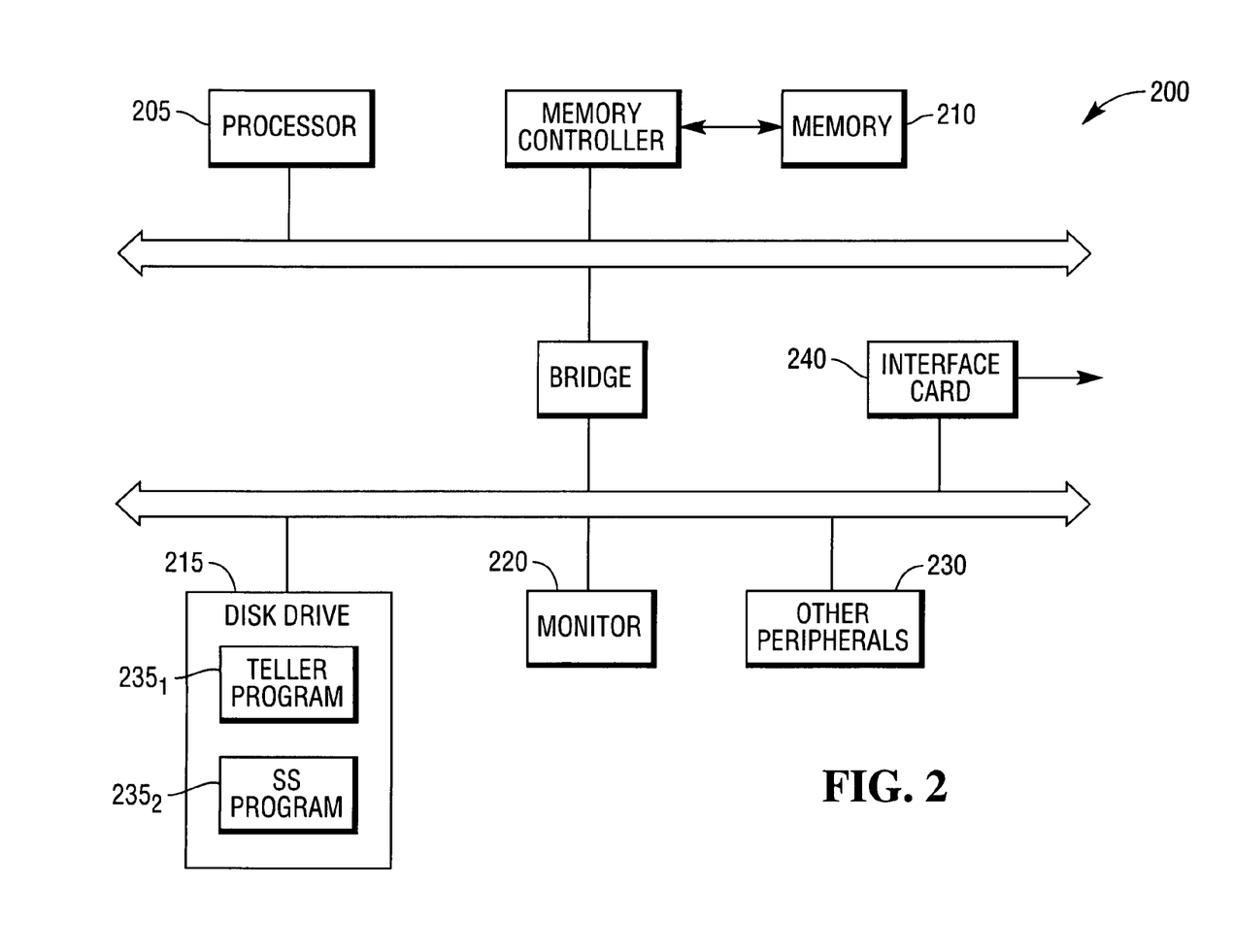
FIG. 2 is a diagram showing a computer system suitable for use in implementing a teller terminal and an assisted self-service terminal in a banking facility.

FIG. 2 shows the typical structure of both the teller terminal 110 and each assisted self-service terminal $120_1 \ldots _N$ of FIG. 1. Each terminal is typically implemented as a computer system 200 having some or all of the following components: one or more processors 205, one or more temporary data-storage components 210 (e.g., volatile and nonvolatile memory modules), one or more persistent data-storage components 215 (e.g., optical and magnetic storage devices, such as hard and floppy disk drives, CD-ROM drives, and magnetic tape drives), an input/output device such as a touch-screen or traditional display monitor 220, and one or more peripheral devices 230. For each assisted self-service terminal, the other peripheral devices 230 include any of a wide variety of electronic modules commonly found in banking self-service terminals, including, for example, a card reader, an EPP pin pad, a cash dispenser, a cash acceptor, a coin dispenser, a coin acceptor, a check acceptor, and a receipt printer. For the teller terminal, the other peripheral devices 230 typically include items such as a keyboard, a printer, a check acceptor, a cash dispenser, and a cash acceptor. The computer system 200 that implements each terminal also includes a network interface card 240 that allows the terminal to connect to the LAN in the banking facility.

Each terminal also includes executable program code, in the form of one or more executable program modules, that is usually stored in one of the persistent storage media 215 and then copied into memory 210 at run-time. In the teller terminal, this program code includes a teller program $235_1$ that controls the operation of the teller terminal. In each assisted self-service terminal, the program code includes a self-service program $235_2$ that controls the operation of the assisted self-service terminal. The processor 205 in each of the terminals executes the corresponding program $235_{1-2}$ by retrieving program instructions from memory in a prescribed order.

Figure 3:
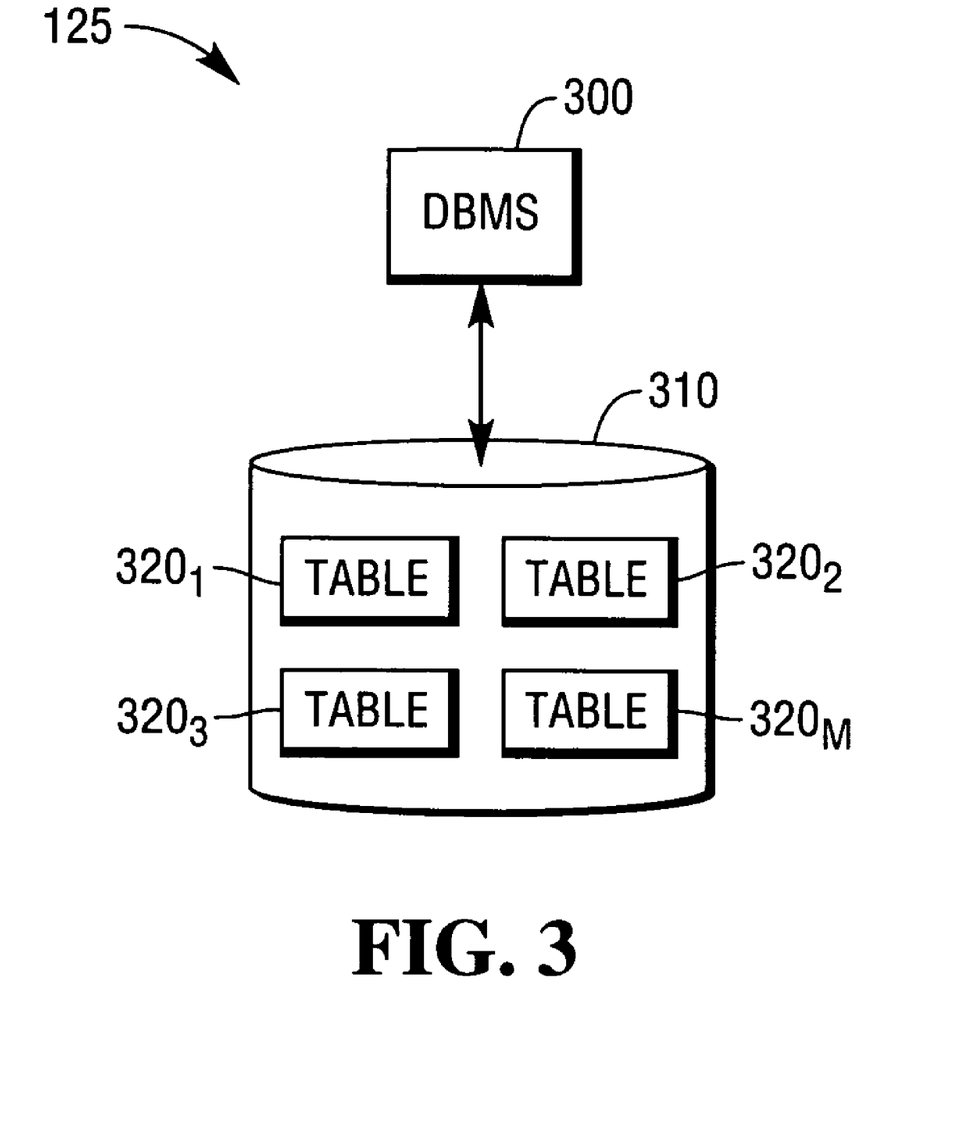
FIG. 3 is a diagram showing the structure of a teller-assist database system.
Figure 4:
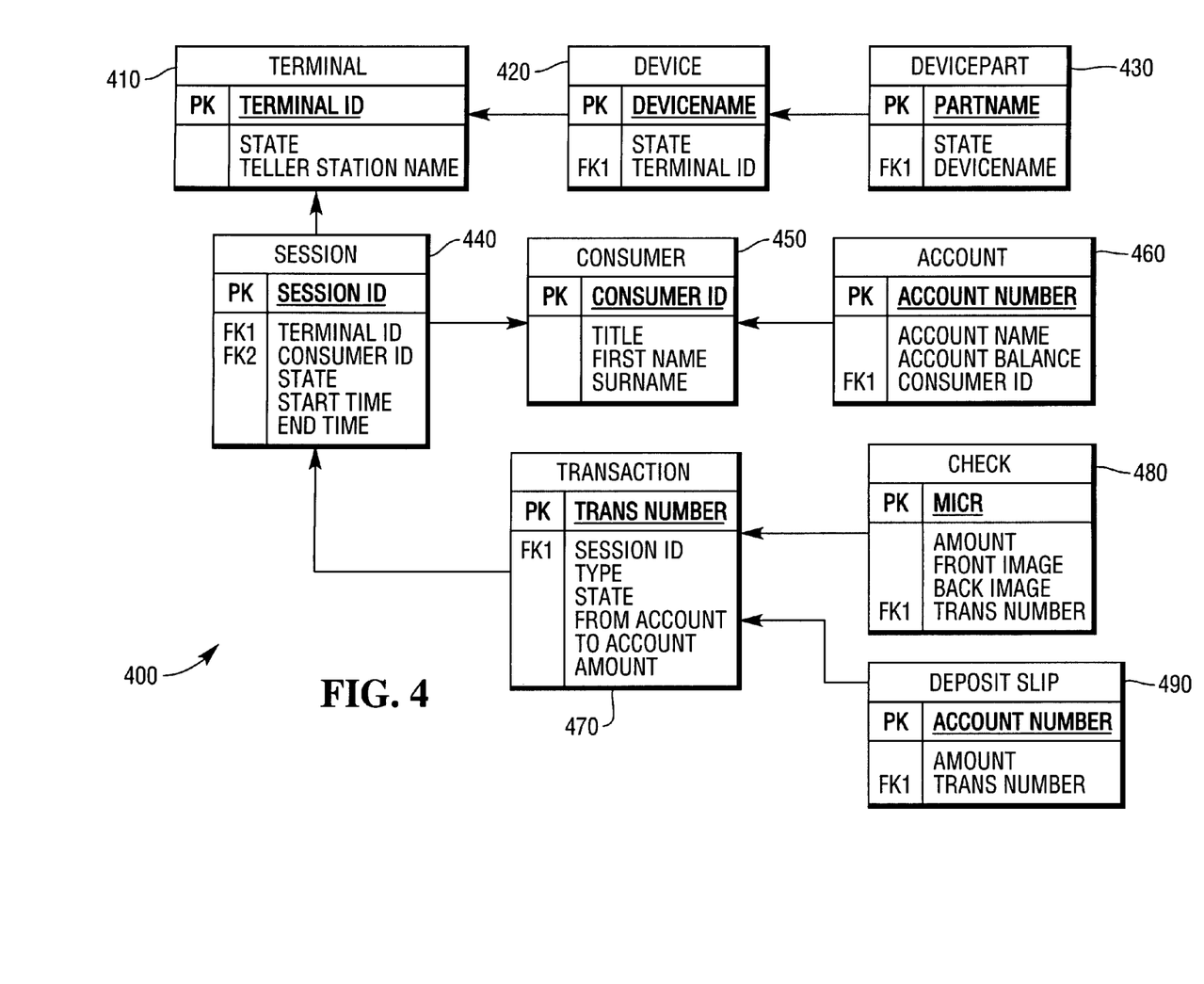
FIG. 4 is a diagram showing a sample database schema for the teller-assist database system of FIG. 3.

FIG. 3 shows one example of a structure for the teller-assist DB system 125 in more detail. The DB system 125 as shown here includes a database-management system ("DBMS") 300 that manages data stored in a data-storage facility 310. The data-storage facility 310 stores data in one or more relational tables $320_1 \ldots _M$ that are organized according to some predefined database ("DB") schema 400, an example of which is shown in FIG. 4. A database schema, as that term is used in the art of database engineering, refers to the logical structure, or organization, of a database system. In a relational database system, the DB schema defines the relational tables that exist in the DB system, the data fields that make up each table, and the relationships that exist among the fields and the tables. The DB schema is typically defined in a formal language (known as a data definition language, or DDL) supported by the DB system.

As an alternative to the database structure shown in FIG. 3, the transfer of information between the teller terminal and the assisted self-service terminals often takes place not through relational tables managed by a traditional database-management component, but instead through the exchange of one or more files, typically files that embody the Extensible Markup Language (XML) standard put forth by the World Wide Web Consortium (W3C). Under this arrangement, the XML files would replace the relational tables shown in FIG. 3, and a file-management system would replace the database-management system. The XML files and the information that they store, however, would still be governed by a database schema, like the one described below.

FIG. 4 shows an example DB schema 400 defining the logical structure of the teller-assist DB system. The DB schema 400 defines a variety of relational tables (or XML structures) that allow the teller and assisted self-service terminals to communicate with each other in executing banking transactions. The number and types of tables that exist in any given banking facility will depend upon the characteristics of that facility, including the system configurations of the teller and assisted self-service terminals and the types of assisted self-service transactions that the facility wishes to support.

The DB schema 400 shown here includes several tables, including a "Terminal" table 410 that includes fields to indicate the ID of each assisted self-service terminal ("Terminal ID"), to indicate the operational state of each assisted self-service terminal ("State"), and to indicate the name of the teller terminal associated with each assisted self-service terminal ("Teller Station Name"). Linked to the "Terminal" table 410 are a "Device" table 420 and a "Device Part" table 430. The "Device" table 420 includes a field to indicate the name for each device, or module, associated with an assisted self-service terminal ("Device Name"), as well as fields to indicate the state of each device ("State") and the ID of the assisted self-service terminal to which the device belongs ("Terminal ID"). The "Device Part" table 430 includes a field to indicate the name of each component of a device that is to be monitored by the teller terminal ("Part Name"), as well as fields to indicate the state of each component ("State") and the name of the device to which the component belongs ("Device Name").

The DB schema also defines a "Session" table 440 that enables banking customers to engage in banking sessions with the assisted self-service terminals. The "Session" table 440 includes fields to indicate the ID of each customer session ("Session ID"), the ID of the assisted self-service terminal on which each session is taking place ("Terminal ID"), and the ID of the customer who is involved in each session ("Customer ID"). The "Session" table 440 also includes fields to indicate the state of each customer session ("State") and the start and end times for each session ("Start Time," "End Time").

The "Session" table 440 links to a "Consumer" table 450 that includes fields identifying each of the banking facility's customers ("Customer ID"), a title for the customer ("Title"), and the customer's first and last names ("First Name," "Surname"). The "Consumer" table 450 in turn links to an "Account" table 460 that identifies all of the accounts associated with each customer. The "Account" table 460 includes fields that indicate an account number ("Account Number"), an account name ("Account Name") and an account balance ("Account Balance") for each of the customer's accounts, as well as the ID of the customer to whom each account belongs ("Consumer ID").

The DB schema 400 also defines a "Transaction" table 470 that monitors every transaction that a customer engages in during a given banking session. Transactions that might occur during a single banking session include, for example, deposits to one or more accounts, withdrawals from one or more accounts, and transfers of funds between accounts. The "Transaction" table includes fields that indicate, where appropriate, for each transaction the transaction number ("Trans Number"), the ID of the session in which the transaction is taking place ("Session ID"), the type of transaction ("Type"), the state of the transaction ("State"), the accounts involved in the transaction ("From Account," "To Account"), and the amount of money involved in the transaction ("Amount").

Linked to the "Transaction" table 470 are tables indicating the types of documents or instruments associated with each transaction. Examples are a "Check" table 480 and a "Deposit Slip" table 490. The "Check" table 480 includes fields indicating, for each check involved in a banking transaction, the MICR ("Magnetic Ink Character Recognition") code printed on the check ("MICR"), the amount of money drawn on the check ("Amount"), images of the front and back sides of the check ("Front Image," "Back Image"), and the transaction number for the transaction in which the check is processed ("Trans Number"). The "Deposit Slip" table 490 includes fields indicating the account number for the account to which each deposit is made ("Account Number"), the amount of money deposited to the account ("Amount"), and the transaction number for the transaction to which the deposit belongs ("Trans Number").

As stated above, any number of other tables could be defined by the DB schema 400, depending on the needs of the banking facility in which the teller-assist DB system resides. The terms "PK" and "FK" appearing in the database schema 400 of FIG. 4 refer to "primary keys" and "foreign keys" for the various database tables. Primary and foreign keys are concepts well understood in the art of database engineering and are not discussed in any detail here.

Communication between the teller-assist DB system 300 and applications using the system (such as the teller program 235$_1$ and self-service program 235$_2$ of FIG. 2) occurs through a commonly accepted connectivity standard. Perhaps the most common such standard is the Open Database Connectivity (ODBC) standard developed by the SQL Access Group. Using a standard such as the ODBC standard for communication with the database decouples database access from the structural and operational details of the underlying DB system, which in turn allows the banking facility to choose its database engine and its teller and assisted self-service terminals and application programs independently of each other.

Figure 5:
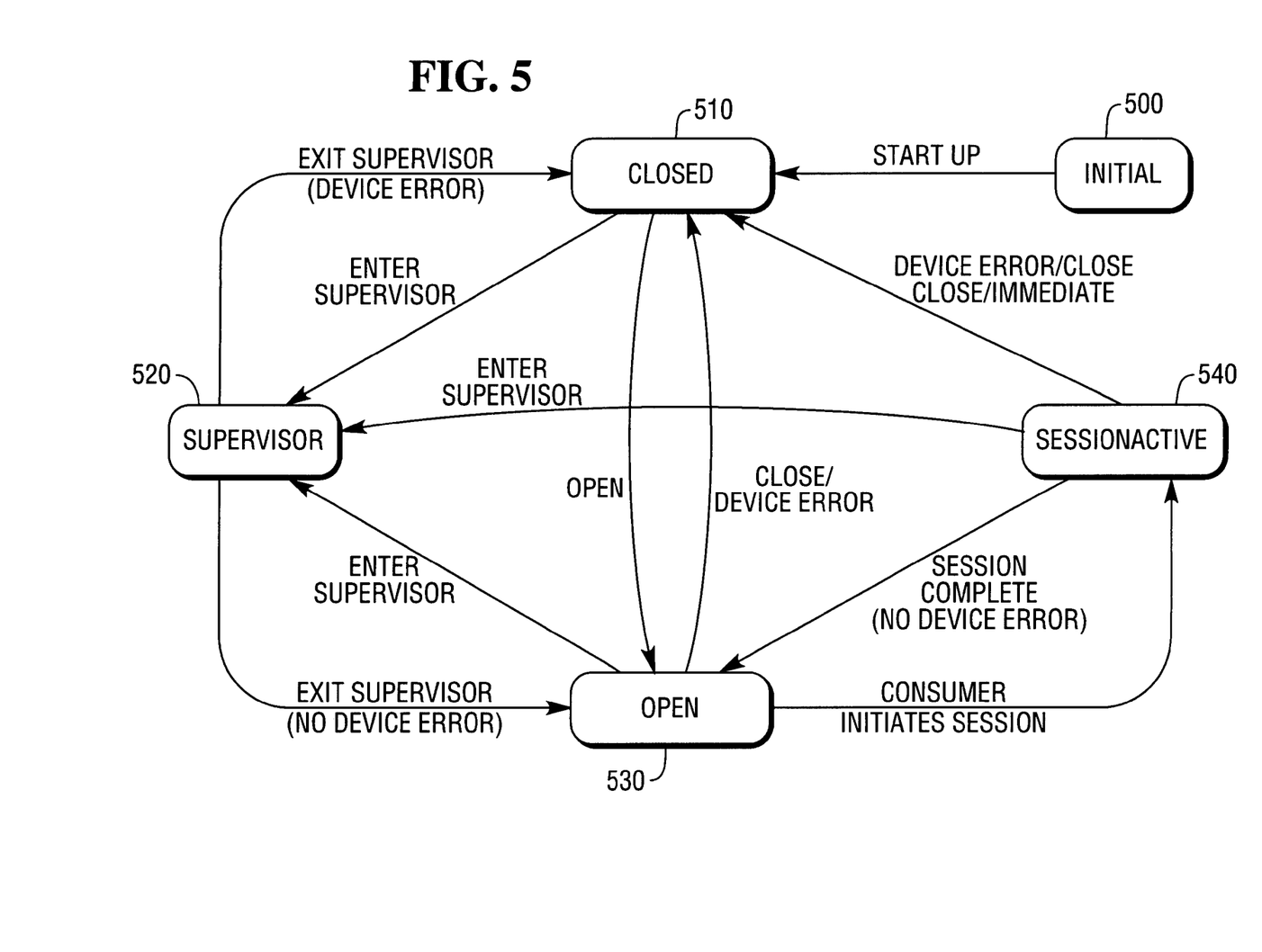
FIGS. 5, 6 and 7 show state transitions in an assisted self-service terminal.

FIG. 5 shows state transitions for each of the assisted self-service terminals. On start-up, each terminal sits in an "Initial" state 500 until start-up is complete and the terminal is ready for operation. The terminal then enters a "Closed" state 510, in which it awaits activation by a bank employee and is not available for customer sessions. A terminal in the "Closed" state 510 will typically display a message on its touch-screen monitor stating that the terminal is out of service.

From the "Closed" state, the banking facility can take the terminal to either a "Supervisor" state 520 or an "Open" state 530. In the "Supervisor" state 520, the terminal is available for use only by authorized bank employees; the terminal is not available for customer sessions. The "Supervisor" state 520 allows the banking facility to perform a wide variety of activities on the terminal, including diagnostics and repair, among others. From the "Supervisor" state 520, the terminal enters the "Closed" state 510 if the banking facility does not want to the terminal available for customer sessions or if an error occurs in the terminal, or it enters the "Open" state 530.

In the "Open" state 530, the assisted self-service terminal is available for customer sessions. The terminal in this state typically displays a message on its monitor indicating that it is open for service and ready to begin a customer session. When a customer engages a terminal in the "Open" state 530, the terminal enters either the "Closed" state 510 (e.g., when an error occurs in the terminal or when the terminal receives an instruction from the teller terminal to close immediately), or it enters a "Session Active" state 540.

In the "Session Active" state 540, the terminal interacts with the customer and communicates with the teller terminal and the teller-assist DB system through its self-service program. If necessary, the assisted self-service terminal in the "Session Active" state 540 sends messages to the teller terminal indicating that the customer needs teller assistance. The terminal remains in the "Session Active" state 540 until an error occurs or it receives an instruction from the teller terminal to close immediately, in which cases it returns to the "Closed" state 510, or until the customer session is completed, in which case it returns to the "Open" state 530.

As the assisted self-service terminal cycles through its various states of operation, the teller terminal receives messages that indicate what is happening at the assisted self-service terminal. These messages include:

"In Service"—The assisted self-service terminal has entered the "Open" state and is awaiting engagement by a customer.

"Out of Service"—The terminal has entered the "Closed" state and is not available for engagement by a customer.

"In Supervisor"—The terminal has entered the "Supervisor" state.

"Device Error"—An error has occurred in the assisted self-service terminal while in or entering the "Supervisor" state or the "Open" state. If the terminal enters the "Closed" state because of the device error, the teller terminal also receives an "Out of Service" message.

"Session Start"—A customer has initiated a session on the terminal and the terminal is entering the "Active" state.

"Session End"—The customer session has successfully completed and the terminal is returning to the "Open" state.

"Help Request"—The customer needs assistance from a bank teller.

In some cases, each assisted self-service terminal also reports the states of the devices it controls, such as its touch-screen monitor and card reader. Device state information is reported according to the common model of the Extensions for Financial Services (XFS) interface specification put forth by the American National Standards Institute, or some equivalent (e.g., J/XFS). Under this standard, each device (e.g., a receipt printer) in the assisted self-service terminal reports its state along with an optional list of critical device "parts" (e.g., paper and toner), if any, that the device maintains. Each device part has a name that is defined by or that can be derived from the XFS standard. The device names, part names, and statuses are stored in the teller-assist DB system as defined by the DB schema, discussed above.

As an example, a check-processing module in an assisted self-service terminal would report any one of several possible status indications at any given time. These status indications include: Online, Offline, Power Off, No Device, Hardware Error, User Error, and Busy. The check-processing module would also report on a part known as "Media," which indicates the status of the financial instrument (e.g., check) handler in the module. Possible status indications for the "Media" handler include: Present, Not Present, Jammed, Not Supported, Unknown, Entering, and Retracted.

The assisted self-service terminal reports state information by inserting the information into the appropriate tables in the teller-assist DB system. The terminal performs an update to the database when any of several events occur, including when:

The terminal receives an XFS device-status change event.
The terminal receives a device-replenishment change event.
The terminal exits the "Supervisor" state.
The terminal exits the "Closed" state.

Figure 6:
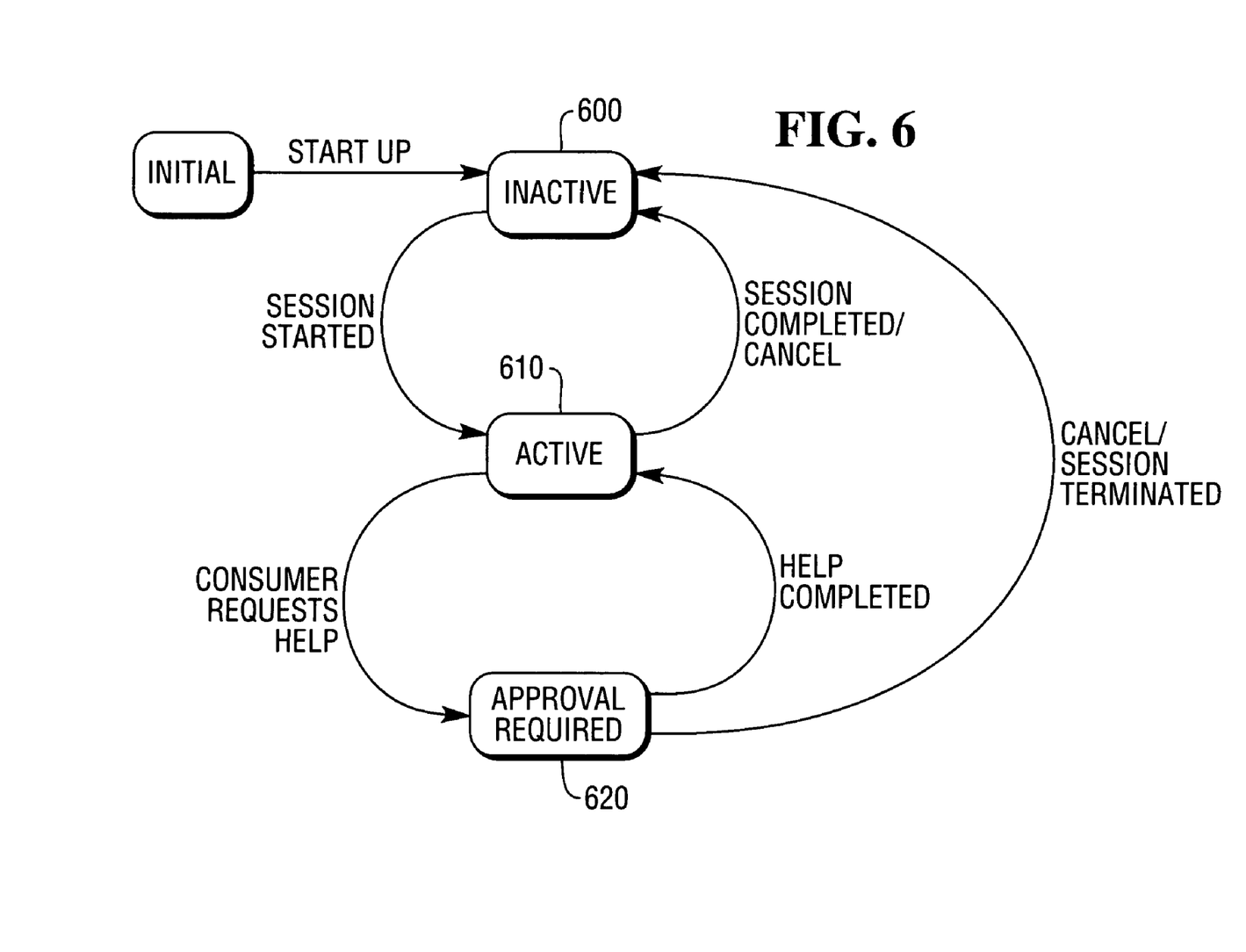

FIG. 6 shows additional state transitions for each assisted self-service terminal when the terminal is engaged in a customer session (i.e., when the terminal is in the "Session Active" state). As the terminal waits for a customer to engage it (e.g., by touching the touch-screen monitor), the terminal remains in an "Inactive" state 600. In the "Inactive" state 600, the terminal, through its display monitor, invites the customer to establish a session and waits for the customer to do so.

When the customer engages the terminal, the terminal enters an "Active" state 610. In the "Active" state 610, the assisted self-service terminal initiates a customer-authentication process which, when completed successfully, identifies the customer and gives the customer access to the customer's accounts. The authentication process in some banking facilities might require insertion of an ATM card and entry of a unique PIN code, as is standard practice in traditional ATMs. In other banking facilities, because the assisted self-service terminal is typically within view of a bank teller, the bank might choose to use an alternative customer-authentication process, such as through entry of a user-id/password combination, completion of a challenge/response exercise, or even visual identification of the customer by the teller. For some types of transactions, such as a deposit to a cash account, the bank might even choose not to require authentication of the customer at all.

Once in the "Active" state 610, the terminal remains in this state as it interacts with the customer until the customer session is completed or canceled, or until the customer or the terminal requests help from a bank teller. When help is requested from a teller, the assisted self-service terminal enters a "Approval Required" state 620 and delivers a message to the teller terminal. The assisted self-service terminal remains in the "Approval Required" state 620 until the teller either indicates that help is completed or terminates the session. If the teller indicates that help is completed, the terminal returns to the "Active" state 610 so that the customer can continue the session. If the teller terminates the session, the terminal returns to the "Inactive" state 600. Typically, the teller terminates the session at the assisted self-service terminal in one of three cases: (1) The teller was able to complete the customer session while helping the customer; (2) the teller has concluded that the session must be completed at the teller terminal; and (3) the teller is unable to complete the transaction at all. In the later case, the teller instructs the assisted self-service terminal to deliver all the information it has gathered to the teller terminal for continued processing there.

In some systems, the "Approval Required" state 620 is also entered when the customer has reached a point in a transaction at which teller interaction is required before the transaction can be completed or fulfilled. For example, if the user is seeking to withdraw an amount of cash that requires teller authorization, the assisted self-service terminal enters the "Approval Required" state 620 and delivers a message to the teller terminal indicating that teller approval is needed. In these systems, the self-service program is configured to enter a "Teller Assist" mode at this point, in which the customer cannot complete the transaction without teller assistance. The customer typically is allowed to cancel or modify the transaction—e.g., reduce the amount of cash requested—without assistance, but the customer cannot complete the transaction without teller intervention.

On entering the "Teller Assist" mode, the self-service program "freezes" the transaction (by preventing its completion as-is) and presents on the assisted self-service terminal an interface that allows teller interaction with the assisted self-service terminal. This interface is typically a graphical user interface that, through interaction with the teller, authenticates the teller as someone who is allowed to take action with respect to the transaction and, upon doing so, allows the teller to indicate the appropriate action. For example, with respect to a large withdrawal request, the teller can authorize or deny the request or can transfer the transaction to the teller terminal for further processing there. Such an interface is described in more detail below.

In general, the notification to the teller that assistance is needed is delivered to the teller-assist terminal through the teller-assist database or file-management system described above. However, other notification techniques are used in some systems, such as through illumination of a light connected to the assisted self-service terminal, a light that is visible to the teller throughout the banking facility.

Figure 7:
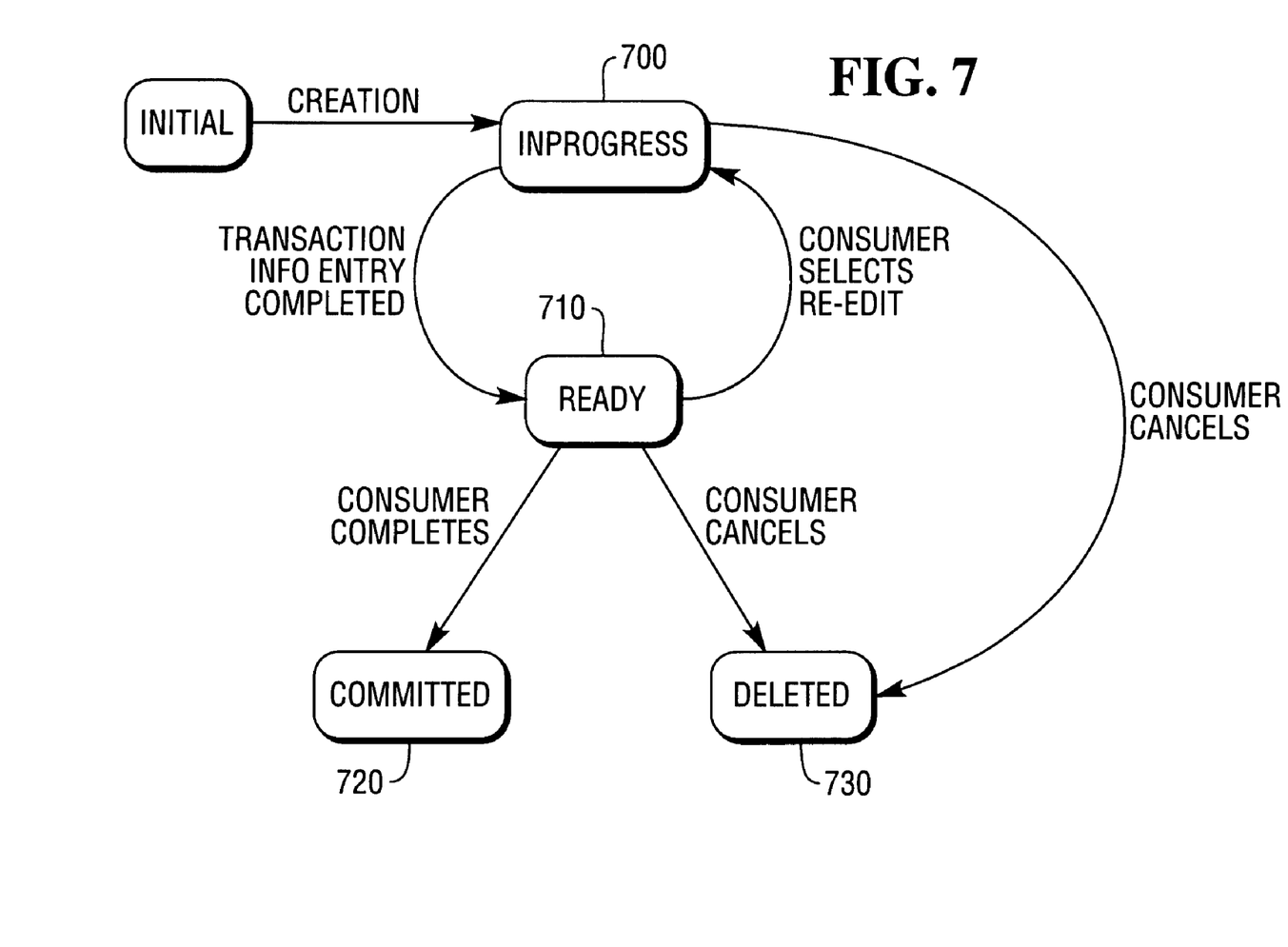

FIG. 7 shows additional state transitions for the assisted self-service terminal when the terminal engages in individual transactions within a customer session. As the customer initiates a transaction, the terminal enters an "In Progress" state 700, in which the terminal gathers information related to the transaction from the customer and from the teller-assist DB system, as well as from other sources such as the branch server, the bank host, and the ATM switch. The information to be gathered includes, for example, the type of transaction to take place, the accounts involved, and the amount of money involved. Once this information has been gathered, the terminal enters a "Ready" state 710, in which the terminal waits for the customer to commit the transaction or to cancel or edit it. If the customer chooses to edit the transaction, the terminal re-enters the "In Progress" state 700. If the customer chooses to commit the transaction, the terminal enters a "Committed" state 720 in which the transaction is completed. If the customer chooses to cancel the transaction, the terminal enters a "Deleted" state 730 in which the transaction is deleted and all of the information related to the transaction is discarded. The terminal also enters the "Deleted" state 730 if the customer chooses to cancel the transaction while the terminal is gathering information in the "In Progress" state 700.

Figure 8:
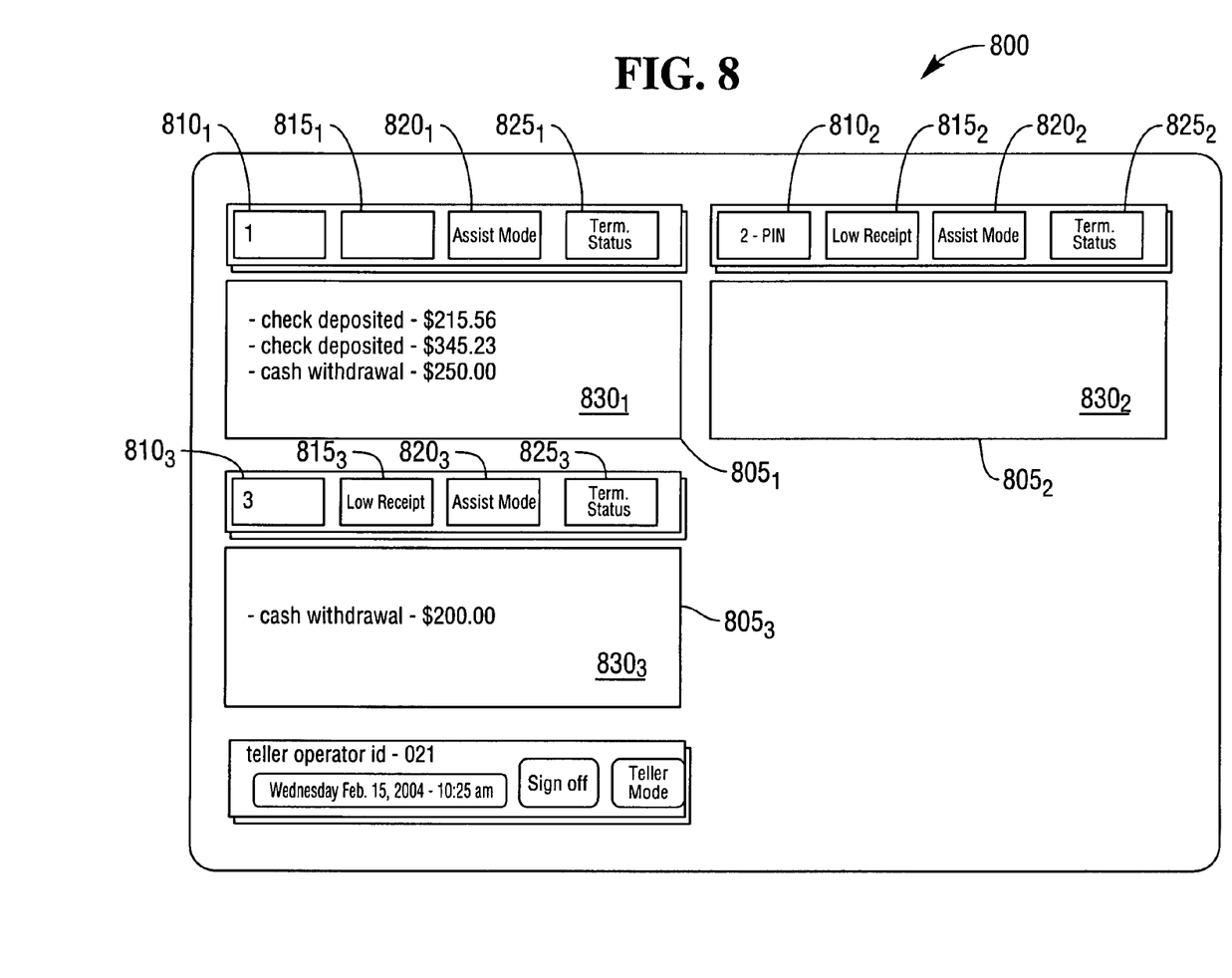
FIG. 8 shows a graphical user interface displayed on a teller terminal.

FIG. 8 shows one example of a graphical user interface, or "teller interface" 800, generated by the teller program ($235_1$ in FIG. 2) at the teller terminal (110 in FIG. 1) to give the bank teller an "at-a-glance" understanding of the status of each assisted self-service terminal ($120_{1...N}$ in FIG. 1) monitored by the teller terminal. The teller can see, for example, whether any of the assisted self-service terminals is engaged by a customer and, if so, what the status of that engagement is and whether the customer needs assistance. The teller interface 800 also provides details for the transactions taking place at each of the assisted self-service terminals.

As shown in this example, the teller interface 800 is a windows-style interface divided into one or more sections, or "terminal windows," each providing the teller with a view of what is transpiring at one of the assisted self-service terminals. In this example, the teller interface 800 is divided into three terminal windows $805_{1...3}$ corresponding to three assisted self-service terminals that are monitored by the teller terminal. For each assisted self-service terminal that it monitors, the teller terminal assigns the assisted self-service terminal an ID number (e.g., "Terminal 1," "Terminal 2," "Terminal 3"), which is displayed in a "terminal ID" box $810_{1...3}$ within the terminal window $805_{1...3}$. The terminal ID box also indicates the status of the corresponding assisted self-service terminal, typically using a color-coding scheme. For example, a terminal ID box shaded in green shows that the corresponding assisted self-service terminal is engaged by a customer and that the customer session is progressing normally, with no assistance needed from the teller. A terminal ID box shaded in red (or blinking red, as described below) shows that the assisted self-service terminal is engaged by a customer and that teller assistance might be needed. In some cases, when the terminal ID box suggests that assistance might be needed, the box also provides a text message indicating what type of assistance is needed and whether the teller should approach the customer immediately or wait some period of time before approaching. The following list shows one example of a color-coding scheme used by the teller terminal.

No shading=Assisted self-service terminal (ASST) is operating properly and is waiting for customer engagement.

Green=ASST is engaged in a customer session.

Flashing green=ASST replenishables (e.g., receipt paper, coins, cash) are running low.

Yellow=ASST is engaged in a customer session, but teller approval is needed for completion of one or more of the customer's transactions.

Flashing red=ASST is engaged in a customer session, and the customer needs teller assistance.

Red=The terminal is closed or has malfunctioned.

Other boxes $815_{1...3}$, $820_{1...3}$, $825_{1...3}$ within the terminal windows $805_{1...3}$ allow the teller terminal to display other messages created by the assisted self-service terminals and, in some cases, to initiate actions within the teller program itself. For example, the terminal windows $805_2$, $805_3$ associated with "Terminal 2" and "Terminal 3" in this example both include message boxes $815_2$, $815_3$ showing that paper in the receipt printer for the corresponding assisted self-service terminal is running low. An "Assist Mode" box $820_{1...3}$ in each teller window allows the teller to engage in an interactive session with the customer at the corresponding assisted self-service terminal without leaving the teller station. "Terminal Status" boxes $825_{1...3}$ allow the teller to gather detailed information about the status of each assisted self-service terminal, including the status of the devices and device parts maintained by the assisted self-service terminal.

The terminal windows $805_{1...3}$ also include "Transaction Details" boxes $830_{1...3}$ that each provides detailed information on the transactions taking place at the corresponding assisted self-service terminal. For example, the terminal window $805_1$ associated with "Terminal 1" in this example shows that the customer is engaged in three separate transactions: (1) a check deposit of $215.56, (2) a check deposit of $345.43, (3) and a cash withdrawal of $250. As described above, the teller terminal and the assisted self-service terminals pass information and messages to each other using the relational tables or XML-based filed defined by the database schema of the teller-assist DB system (125 in FIG. 1).

Figure 9A:
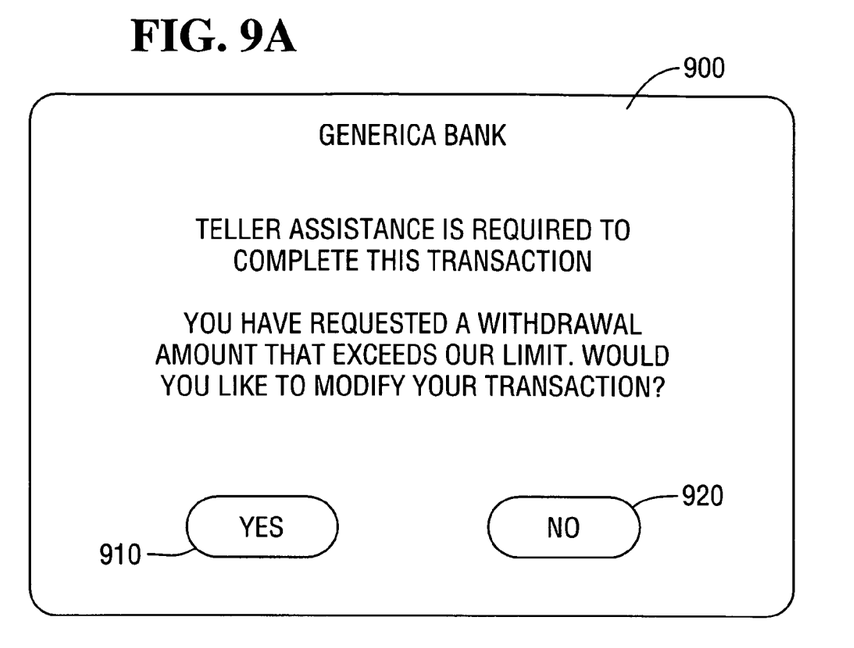
FIGS. 9A and 9B are examples of interface screens displayed at the assisted self-service terminal when teller assistance is needed for completion of a transaction.

FIG. 9A shows an example of a user interface that appears on the display monitor of the assisted self-service terminal when the customer requests a transaction that requires teller authorization. In this example, the customer has requested a cash withdrawal that exceeds the limit for the self-service terminal. The self-service program that drives the terminal's interaction with the customer enters the "Teller Assist" mode described above and presents an interface screen 900 that informs the customer that teller authorization is needed. The interface screen 900 includes buttons 910, 920 that allow the customer to instruct the terminal either (a) to exit the "Teller Assist" mode so that the customer can modify or cancel the transaction, or (b) to remain in the "Teller Assist" mode and notify the teller that intervention is needed.

Figure 9B:
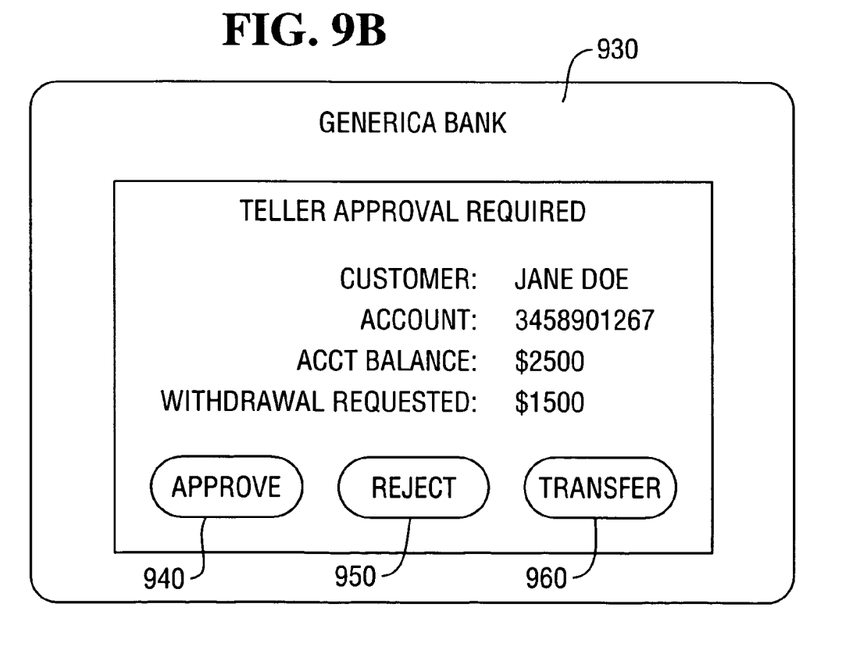

FIG. 9B shows an example of an interface screen 930 that appears on the display monitor after the teller has been notified that assistance is needed and has been authenticated at the assisted self-service terminal. In the example shown here, the interface screen 930 presents information about the requested transaction (e.g., information identifying the customer, the account affected, the balance in that account, the type of transaction requested, and the amount of cash requested). The interface screen 930 also displays buttons 940, 950, 960 that present the teller with three possible actions—approval of the transaction, rejection of the transaction, and transferal of the transaction details to the teller terminal for further processing there.

If the teller chooses to approve the transaction, the assisted self-service terminal typically exits the "Teller Assist" mode and fulfills the customer's request. If the teller chooses to reject the transaction, the terminal typically exits the "Teller Assist" mode and gives the customer the option to either modify or cancel the transaction. If the teller chooses to transfer the transaction to the teller-assist terminal, the assisted self-service terminal typically exits the "Teller Assist" mode and transfers all of the customer's requested transactions to the teller terminal, thus freeing itself for use by another customer. The precise operation of the assisted self-service terminal in each of these situations, however, typically depends on a variety of factors, including the number and types of transactions the customer has requested, the nature of the transaction for which teller assistance is needed, and the business needs of the institution that operates the terminal.

The text above describes one or more specific embodiments of a broader invention. The invention also is carried out in a variety of alternative embodiments and thus is not limited to those described here. For example, while the invention has been described above primarily through the example of an assisted self-service terminal for use in execution of financial-services transactions in a banking facility, the invention is useful in a wide variety of self-service applications, including for example airport check-in, food-service order, and medical check-in, to name a few. Many other embodiments are also within the scope of the following claims.

We claim:

1. A system comprising:
    a) an Automated Teller Machine, ATM, which allows a customer to conduct a transaction with a bank
    b) a notification mechanism which transmits a message to the bank indicating that a human representative of the bank must give approval before the transaction can continue; and
    c) an interface component that allows the human representative to give the approval to the ATM.

2. The system of claim 1, in which the interface component resides at the ATM.

3. The system of claim 1, in which the notification mechanism includes a teller terminal, remote from the ATM, through which the human representative monitors operation of the ATM.

4. The system of claim 3, in which the notification mechanism includes a database system
    i) that receives information from the ATM and
    ii) that is accessible by the teller terminal.

5. The system of claim 3, in which the notification mechanism includes a file-management system that receives information from the ATM and that is accessible by the teller terminal.

6. The system of claim 1, in which notification to the human representative is initiated by the ATM.

7. The system of claim 6, in which the notification mechanism includes a light positioned in a manner to be visible to the human representative when the human representative is standing away from the ATM.

8. The system of claim 1, in which the interface component presents the human representative with an option to authorize the transaction, and in which the transaction does not complete without authorization.

9. The system of claim 1, in which the interface component presents the human representative with an option to reject the transaction.

10. The system of claim 1, in which the interface component presents the human representative with an option to transfer details about the transaction to a teller terminal remote from the ATM.

11. The system of claim 1, in which, in connection with transmission of the message by the notification mechanism, the
    ATM enters an assist mode that prevents the customer from completing the transaction.

12. A system according to claim 1, in which a message indicating that approval is required is also transmitted to the customer at the ATM.

13. A method of operating an Automated Teller Machine, ATM, which is operated by a bank, comprising:
    a) completing some transactions with customers of the ATM without approval of a human representative of the bank;
    b) in at least one other transaction,
        i) suspending the other transaction,
        ii) notifying a human representative of the bank regarding the other transaction,
        iii) receiving, at the ATM, approval from the human representative, and
        iv) completing the other transaction after receiving the approval.

14. A method according to claim 13, in which the other transaction is not allowed to complete without approval from the human representative.

15. A method of operating an Automated Teller Machine, ATM, which is maintained by a bank, comprising:
    a) receiving a request from a customer for a transaction,
    b) collecting data concerning the transaction,
    c) if a predetermined condition occurs,
        i) suspending the transaction,
        ii) notifying a human representative of the bank,
        iii) awaiting approval from the human representative,
        iv) completing the transaction if approval is received, and
        v) if approval is not received, sending some, or all, of the data to a teller station at the bank, without completing the transaction.

* * * * *